T. A. LEE.
FIREPROOF FLOOR.
No. 11,356. Reissued Aug. 8, 1893.
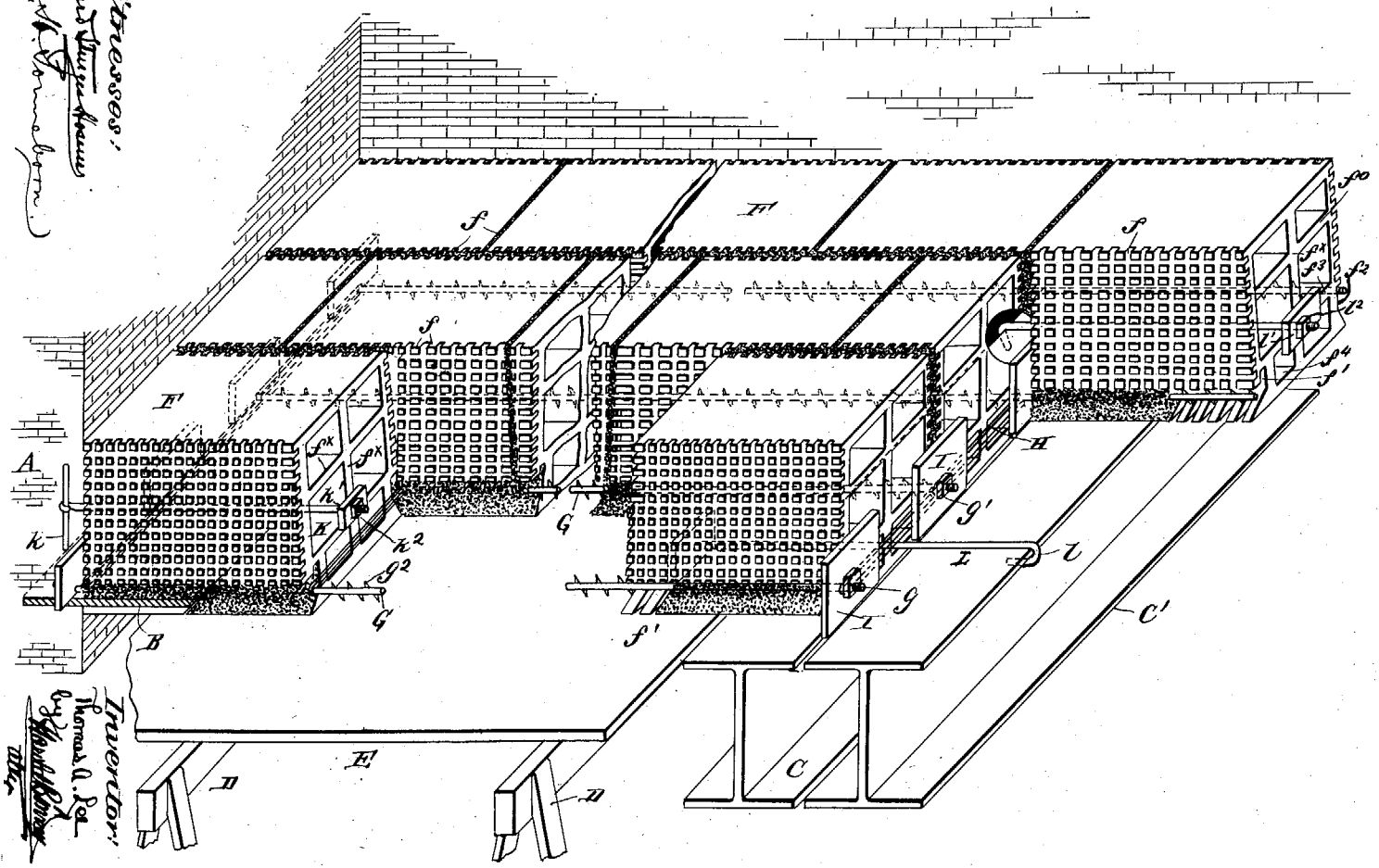
Witnesses:
Edward Hugus Hoeme
Geo. H. Fonnebom
Inventor:
Thomas A. Lee
by Harold Bonney
Atty.

UNITED STATES PATENT OFFICE.

THOMAS A. LEE, OF NEW YORK, N. Y., ASSIGNOR TO THE LEE FIRE PROOF CONSTRUCTION COMPANY, OF COLORADO.

FIREPROOF FLOOR.

SPECIFICATION forming part of Reissued Letters Patent No. 11,356, dated August 8, 1893.

Original No. 461,029, dated October 13, 1891. Application for reissue filed June 3, 1893. Serial No. 476,545.

*To all whom it may concern:*

Be it known that I, THOMAS A. LEE, of the city of New York, in the county and State of New York, and formerly of Kansas City, in the State of Missouri, have invented certain new and useful Improvements in Fireproof Construction for Floors, Roofs, and Like Structures, of which the following is a description, reference being had to the accompanying drawing, which forms a part of this specification.

The object of my invention is to form a light, strong, and firm, fire proof floor, roof, or like structure, capable of withstanding the loads for which it is intended without the intervention of I-beams.

To these and certain other purposes hereinafter explained, my invention consists of the novel construction and combination of parts, arranged, and used, substantially in the manner hereinafter described, illustrated, and claimed.

Heretofore flat fire-proof floors have been formed with I-beam joists of steel or iron, which rest upon the carrying-supports and which are set at distances of about five feet apart and tied together with rods; and, between, were filled with hollow blocks, usually in form of flat arches, the thrust being sustained by the I-beams. Often the beams spring and allow the deflection of one arch more than another and cause cracks in the ceiling. Still more often arches, portions, or single blocks are dislodged. In my improved method I dispense with the beams and the separate arches and so construct the blocks as to use them directly to sustain the weight of the floor upon the carrying-supports throughout the length of the supports and without end thrust.

Briefly, my improved floor consists (in its most complete form) of parallel courses of floor blocks continuous in length from one carrying-support to the other carrying-support, with doweled cemented joints between the tiles, and with tension rods laid parallel with the courses and embedded in cement near the lower surface of the floor and bound together transversely by binding links. The transverse strength, which might otherwise be imparted by I-beams, or by curved suspension rods anchored at their ends, is in my floor provided in each course by the combination of blocks and rods, while the firm bond obtained by the dowel joints and the binding links distributes the weight of a load, concentrated upon any block or course, over the neighboring courses. I have found that floor-blocks of proper material and dimensions are quite capable, in themselves, of sustaining the full compressive or crushing force to which the upper portion of a floor is subjected. The under portion, however, which, owing to the lesser tensile strength of cement, would rupture under the tensile strain to which it is subjected, is reinforced by tension rods, making it proportional in strength to the compressive strength of the upper portion. My invention may be better understood, in this respect, by comparing each course of floor blocks and tension rods to a girder or I-beam. The portions of the floor-blocks lying near the upper surface of the floor correspond in action, when subjected to the transverse force of a load, to the compression bearing member of the structure; the tension rods and surrounding material in the lower portion of the floor correspond to and form the tension sustaining member of the structure; and the intermediate portion of the floor, along the neutral axis, corresponds with the web of the I-beam or the neutral axis of any other form of girder or beam.

In the drawing, the figure is a view in perspective showing the supports for the respective end blocks of the courses forming the floor; the courses of blocks extending in length continuous from one carrying-support to the other; the blocks of a course breaking joints with the blocks in adjoining courses; the temporary platform beneath all the blocks in the courses; the tension-rods in the base of the courses of blocks; the vertical dowel-joints between contiguous sides of the courses of blocks; the end blocks of a course clamped to the floor-carrying supports; and the courses of blocks linked together in contiguity continuous transversely from one of the ends of the carrying-supports to the other ends of the carrying-supports.

A represents the side wall of a building in which is built or laid a wall-plate B, which plate projects horizontally a suitable distance to support the floor blocks at one end of the courses. The other support for the blocks at the other end of the courses is represented by the parallel girders C C′, upon the upper top flange of one of which, C, the end blocks are laid, as hereinafter described. In narrow or ordinary buildings the girders C are not used; for the courses or floor-blocks are constructed of length sufficient to reach from one side wall to the other side wall of the building.

Between the wall A and girder C are placed the temporary horses or scaffolding D D, upon which is laid a temporary floor E, slightly cambered and lying with its upper surface a slight distance below the plane of the wall plate B and the upper flange of the girder C. Upon this temporary support I lay my floor, removing the support after the floor has thoroughly hardened.

The floor blocks F F, which are used in my construction of the floor, are ordinarily composed of hollow fire-proof material, preferably porous tile, known as terra cotta lumber, and the ends of the blocks may be cut at an angle or key-shaped to obtain the proper support from each other in the floor. Each hollow floor-block is preferably formed with a vertical inner wall or partition $f^{\times}$, which extends from the upper wall to the lower wall, centrally and parallel with the sides of the block, and with two horizontal inner walls or partitions $f^{\circ}$ and $f^{3}$, which intersect at right angles the partition $f^{\times}$, and extend both sides of the partition to the side walls of the block. Thus the block is divided into several compartments or hollows. Between the partition $f^{3}$ and the base are the smaller compartments or hollows $f^{4}$. In the outer surface at the base of each block upon one side is made a longitudinal cavity $f'$ and upon the other side a longitudinal recess or cavity $f^{2}$. In the outer surface of the sides of each block are made the vertical grooves $f\,f$, which extend from top to bottom of the block. The cavity, grooves, and recess are made in the blocks while they are in the process of manufacture. The blocks are received at the place for executing the work all formed, cut, and ready for use.

To impart the requisite tension strength to the floor, I employ the tension rods G, the length of which is slightly in excess of the length of a course of the floor-blocks. Each end of the rod G is preferably screw threaded at $g$ and provided with a washer I, and a nut $g'$ fitted to the screw-threaded end $g$. This is my preferable way of retaining the washer. In practice however, I sometimes provide the rod G with an eye at a suitable distance from each end, into which after the washers I I are placed upon the rod, a small pin is pushed, thus retaining the washers upon the rod. The rod G, while in manufacture, is made with small projections $g^{2}$ which are placed at short distances apart. These projections enable the cement to cling and unite firmly to the rod and prevent the rod pulling loose or slipping through the cement. Around both ends of the rod G, against the inner sides of the washers I I, is looped a strand of wire H, and at regular points of three or four feet along the rod between the washers I I similar strands H are placed. The wires are twisted or linked slightly to cause them to remain in place while the rod is being put in position. The strands of wire are placed at distances apart which exactly correspond to the length of a certain number of floor-blocks, usually three or four. In preparing to execute a piece of work under my invention these rods, thus fully prepared with projections, nuts, washers, threads, and strands of wire, in advance, go into the hands of the workman complete and ready to be laid in place in the cavities of the courses of blocks.

As my floor is without end thrust, I am able to secure the end blocks of a course, and thereby the whole floor, to the floor-carrying supports, and also to tie the building together, by block-clamping rods K and L, which are alike in effect but slightly different in shape, so as to be adaptable to the different kinds of carrying-supports. These rods unite the floor and the supports or walls together by being made fast at one end within, and at the inner end of, the first, or end block, at each end of a course. Sometimes, however, it is desirable to make them of sufficient length to be made fast at the inner ends of the blocks second in position from the ends. The other ends of the rods K and L are made fast to the carrying-supports or the walls. Preferably these block-clamping rods occur first in the third course from the end of the floor or roof, and afterward in every sixth course throughout the length of the floor or roof carrying-supports.

The rods are placed in position in the following manner:—The block-clamping rod K has attached thereto upon one end a cross-bar $k$. This end, with the cross-bar $k$, is built in place within the walls of the building as the walls are erected, and the rod is placed in position at a suitable height and interval along the wall to come in line with a course of floor-blocks. The other end of rod K is screw-threaded, and is provided with washer $k'$ and nut $k^{2}$.

Upon the girder C′, directly opposite and in line for the same course of blocks as rod K, is the other block-clamping rod L. Upon one end of this is a hook $l$, which is hooked over the upper flange of the girder C′. The other end of the rod L is screw-threaded and provided with a washer $l'$ and nut $l^{2}$, the same as block-clamping rod K. These block-clamping rods occur as often as necessary to properly secure the floor or roof to its carrying-supports and to form suitable ties for binding the building or the walls of the building together.

In constructing the floor after having provided the carrying-supports, the temporary scaffolding, and the block clamping rods, as described, I first take one of the tension rods already prepared and completed, as described, and place it horizontally in position next to the end wall of the building, (or the wall at an angle in the figure to the wall A) and support the rod temporarily in position a slight distance above the carrying-supports B C. The free ends of the wire H, against the washer I, are then laid in position transversely to the rod and to the course of blocks to be laid. In like manner the other strands of wire along the rod are laid out. One of the floor-blocks F is then spread with mortar in the recess, $f^2$, that is to come in contact with the tension-rod just laid; upon the whole side which is to adjoin the end wall of the building; and upon the end which is to touch the washer and wire H at the end of the tension rod, and the side wall of the building. The block is then set upon the temporary scaffolding with the hollows toward wall A, and is then shoved or pressed firmly, endwise against washer I, wire H, and wall A, and sidewise against the tension-rod G and the end wall of the building, the flat bottom surface at the outer end resting directly upon carrying-support B. The tension rod G is received partly within the recess $f$ and embedded in the cement. The cement upon the side of the block, which has entered the vertical grooves, now presses upon and around the tension-rod G and its projections, so that the tension rod and the block, by means of the cement and its adhesion to the vertical grooves in the block and the projections on the tension-rod, are bonded and united together in such a manner that the cement when hard prevents longitudinal movement one upon the other. The strand of wire H is then drawn across the inner end of the block; after which another block is taken, spread with the cement and shoved in place, in the same manner, one end against the inner end of the first block and the strand of wire H, and one side against the tension rod G and the end wall of the building, care being taken to fill the joints between the ends of the blocks, so that the shell or wall portions of the second block bear squarely against the like portions of the first block. A third block is then taken and laid in like manner, and after this, others. A strand of wire H is drawn across the inner end of a block whenever the point, at which a wire is located, is reached. When the blocks set reach the center of the floor, work is begun at the opposite end of the course and upon the carrying-support C, and the same process of setting the blocks is followed until a point near the center is reached, when the course is completed by setting the key-shaped block in the center. The cavity $f'$ is thereby made continuous throughout the whole length of the course, the cavity in each block registering with the others longitudinally. So also the recess or cavity $f^2$ in each block registers longitudinally, and both recesses $f'$ and $f^2$ register with each other in adjacent courses. Care is taken that the vertical joints between the contiguous ends of all the blocks are filled with cement and struck that the blocks may have a fair bearing endwise, one against the other. I then take a second tension-rod G, which is complete with projections, washers, nuts, and strands of wire, and place and temporarily support it in the cavity $f'$ in the base of the course of blocks just set, the washers I I bearing against the ends of the shell or outer walls of the end blocks already set; and I twist around the rod G the free ends of all the strands of wire H, extending across the course from the first set tension-rod, at the end of the course and between the interior blocks wherever occurring. The second tension rod G is thereby tied to the first course of blocks by metal ties and these ties are part of the metal tie which is to bind the second course of blocks to the first course of blocks. I then as in the first instance draw or lay out, at right angles to the course set, the strands of wire H from said second tension rod now in position, and ready to receive the next or second course of blocks and to project beyond it and its cavity. I start the second course of blocks separately as before from each carrying-support B and C and complete it in the center with a key block. The length of the end blocks for the second course is such that the blocks throughout the course break joints with blocks in the first course. Before setting the end block it will be understood, I place and pack cement in the cavity $f$ of the first course over, and around the said second tension-rod G for a distance back from its end at least equal to the end block to be set in the second course. I then spread cement upon the end of the end block that is to go against washer I, wire H, and wall A, and within its recess and upon its side that is to come in contact with said second tension rod G and the first course of blocks, the cement upon the sides being sufficient to enter the grooves in both its sides and in the side of the blocks in the first course against which it is to lie when pressed into position. Cement is then placed in cavity $f'$ of first course over and around said second tension-rod G a distance equal to the length of another block, and a second block is spread with cement upon its end, in the recess $f^2$ upon its side, and in the grooves, which are to adjoin the said second tension-rod and side of the first course of blocks. It is then shoved in position, one of its ends against the inner end of the end block just set. It breaks joints with the blocks in the first course. The vertical dowel is made complete by thus bringing together in contact the grooved side of the two courses of blocks. The cement hardens on and around the projections of the said second tension-rod G, also in the grooves of the blocks, and between the grooves and the sides of the two courses of blocks thus brought into contact. In the cavity or recess of the second course I then lay a third tension-rod twisting the strands of wire around it as before and filling in about it with cement. The course is then laid as before and successive courses with tension-rods, cement, and ties, laid in like manner till the floor is completed. The strands of the wire H are twisted several times or otherwise finally secured to the last laid tension-rod completing the metal tie and uniting the several courses together throughout the floor.

When I come to a course which is to receive the clamping rod K, the screw-threaded end of the rod enters a hollow of the end block as the latter is set in place and extends through the hollow beyond the other end of the block at one side of the vertical partition $f^{\times}$ in the said block. Upon the screw-threaded end of the rod K is then placed a washer $k'$, which rests against the outer portion of the partition of the block F. A nut $k^2$ is turned upon the rod against the washer $k'$. Upon the girder C the screw-threaded end of the block-clamping rod L is similarly inserted through the hollow alongside of the partition $f^{\times}$ of the end block F, laid in line with the end block into which block-clamping rod K has been received. Upon the screw-threaded end of the rod L is then fitted a washer $l'$ and a nut $l^2$ which bears against the washer. In this manner the end blocks of a course are clamped to the supports. I then continue setting blocks in the same manner as in other courses, complete the course, supply it with a tension-rod, and bind the course fast to the course previously set in the same manner as other courses. Thereby the whole becomes clamped to the carrying-supports, and the walls are tied firmly together. By this method of constructing a fire-proof floor and roof and clamping it to its support or to the walls of the building, I am enabled to make use of the ordinary hollow-ware fire-proof material placed in contiguity in each direction throughout the floor or roof, binding each separate piece to the others by cement, dowel-joints, and metal ties. By these metal ties linking the courses together, one with the other continuously, the cement bond between the courses and between the tension-rod and the courses is made secure and greatly strengthened. Hence there cannot be a separation between the courses or a movement either longitudinally or vertically of one course of blocks upon the other, or of one course of blocks upon the tension-rod. There can be no dislodgment of a block in the floor or deflection of one portion beneath another, as often occurs now with the system of flat-arches and I-beams. By this means of constructing a floor or roof, whereby the hollow blocks are laid and united in contiguity at their ends in courses continuous from one carrying-support to the other, and whereby the courses are laid, united, and linked together side by side in contiguity, transversely continuous from one end of the carrying-supports to the other, I am enabled to construct a fire-proof floor or roof lighter, stronger, safer, more substantial, and cheaper than by the means, methods, and systems now used.

In constructing my floors and roofs I prefer to use the ordinary hollow ware fire-proof material, such as porous terra cotta, but other materials may be used, such as manufactured blocks of straw, paper, cement, plaster, &c.

The tension rods and binding links are composed preferably, of steel of high-tension strength: but wrought-iron or other material may be substituted.

The temporary floor is retained in place beneath the blocks until the cement between the blocks has hardened, when the floor is self-sustaining.

By constructing the blocks in courses which are continuous in length from one carrying-support to the other carrying-support and placing tension-rods in the bases of the courses of blocks and binding the courses together in contiguity by dowel-joints, metal ties, cement bonds, and tension-rods, as described, I am enabled to obtain the united compression and tension resistance of the courses of the blocks, throughout the length and breadth of the floor or roof, to strains from loads upon the floor or roof, thereby considerably increasing its strength for concentrated loads. The cement which is placed between the side walls of the blocks and courses enters the vertical grooves $f$, which register with one another in the courses, and a vertical dowel is formed which adheres to the sides of the blocks, and thereby increases the resistance to longitudinal strains or shearing; while by the breaking of joints of the blocks in a course with the blocks in adjoining courses, I strengthen the courses of blocks in compressive resistance at the top and in the tension resistance at the base, which, in conjunction with the metal ties linking and binding the courses together, greatly increases the strength and safety of the floor or roof in every individual part. It is owing to the characteristics of my construction that this strength "in compressive resistance at the top and in tension resistance at the base" is obtained in the floor itself without the use of iron I-beams or other iron work possessing independent transverse strength.

I believe I am the first to produce an unarched and untrussed floor of tiles or other floor blocks and at once entirely without beams and entirely without truss rods or tie rods serving as truss or curved suspension rods.

I am well aware that tiles and curved tie rods have served to truss up the central portions of the floor after the manner of a simple trussed beam and without depending on a continuous bond between the tiles and the rods throughout their length. I am also aware that straight tie rods have been used merely to tie together the ends of courses of tile on the arch principle without end thrust. But my invention is clearly distinguished from all such forms by reason of the fact that my floors are constructed, and operate, precisely on the principle of a row of simple beams, simple transverse strength alone being called upon to resist loads. What I have done then is to invent a tile, or terra cotta, or other, block floor in which the tensile strength beneath is equal or proportional to the compression strength above. I do this by my rods firmly cemented in the base of the floor and imparting to the latter at every point strength not otherwise its own. It is largely to make this distinction clear that this reissue has been asked; for obviously no one of the other floor constructions mentioned has upper portions designed particularly to give "compressive resistance at the top" and a parallel under portion or base containing tension rods and designed particularly to give tension resistance at the base and hollow tilework between forming virtually an openwork web firmly separating and binding these two portions or members together and giving strength and lightness somewhat after the manner of a latticework girder, beam, or like structure.

I claim—

1. In fire-proof floors and roofs composed of separate courses of hollow floor-blocks in contiguity, having a cavity in the base of each block and extending the length of and registering with each other in each course, the combination of a tension-rod cemented within the said registering cavities of a course of said blocks and a link connecting the said course of blocks with each other, substantially as described.

2. In fire-proof floors and roofs composed of separate courses of hollow floor-blocks in contiguity, having a cavity in the base of each block and registering with each other, the combination of a tension-rod cemented within the said registering cavities of adjacent courses of said blocks and a vertical dowel uniting the courses, substantially as described.

3. In fire-proof floors and roofs composed of separate courses of hollow floor-blocks having registering cavities in the base of the blocks extending the length of each course, the combination of two adjacent courses having meeting cavities, and a tension-rod cemented within the said meeting cavities, substantially as, and for the purposes, described.

4. In combination in a floor or roof, hollow floor-blocks cemented together and tension-rods cemented in the base of the said floor, the upper parts of the said cemented floor-blocks forming the compression resisting portion of the floor, and the said cemented tension-rods forming with the base of the floor the tension resisting portion united and parallel with but separated from the said compression resisting portion by the hollows and walls of the said blocks, substantially as, and for the purposes, set forth.

5. In fire proof floors and roofs composed of courses of floor blocks in contiguity, one or more tension-rods cemented within the base of the said floor or roof, and a vertical dowel uniting the courses, substantially as, and for the purposes, set forth.

6. In a fire-proof floor or roof composed of courses of floor blocks in contiguity, one or more tension-rods cemented within the base of the said floor or roof, and one or more metal links connecting the said blocks and rods with each other transversely, substantially as, and for the purposes, set forth.

7. In a floor or roof, hollow floor blocks cemented together and tension rods formed with irregular surface to insure better grasp for the cement and cemented in the base of the said floor to increase its tension resisting strength, whereby the use of I-beams, trussing, or other transverse support, is obviated, the upper parts of the said floor-blocks forming the compression resisting portion of the floor, and the said tension-rods with the base of the floor forming the tension resisting portion, united and parallel with, but separated from, said compression resisting portion by the hollows and walls of the said block, substantially as and for the purposes, set forth.

In testimony whereof I have hereto set my hand this 13th day of April, 1893.

THOMAS A. LEE.

Witnesses:

HAROLD BINNEY,

PIERRE DE CHAMBRUN.